(12) United States Patent
Sugiura et al.

(10) Patent No.: US 9,045,161 B2
(45) Date of Patent: Jun. 2, 2015

(54) PASTE FORM HEAT-BLOWING INJECTION COMPOSITION AND METHOD FOR INJECTING AND SOUNDPROOFING CLOSED SECTION OF AUTOMOBILE BODY MEMBER

(75) Inventors: Yutaka Sugiura, Daitou (JP); Masaki Ukai, Takarazuka (JP); Kiyoyuki Gotou, Neyagawa (JP)

(73) Assignee: SUNSTAR GIKEN KABUSHIKI KAISHA, Osaka (JP)

( * ) Notice: Subject to any disclaimer, the term of this patent is extended or adjusted under 35 U.S.C. 154(b) by 518 days.

(21) Appl. No.: 12/659,507

(22) Filed: Mar. 11, 2010

(65) Prior Publication Data

US 2010/0187116 A1    Jul. 29, 2010

Related U.S. Application Data

(62) Division of application No. 10/559,477, filed as application No. PCT/JP2004/007997 on Jun. 2, 2004, now abandoned.

(30) Foreign Application Priority Data

Jun. 4, 2003 (JP) .................. 2003-159706

(51) Int. Cl.
*B29C 67/00* (2006.01)
*B62D 29/00* (2006.01)
*C08J 9/00* (2006.01)
*C08L 21/00* (2006.01)

(52) U.S. Cl.
CPC .............. *B62D 29/002* (2013.01); *C08J 9/0061* (2013.01); *C08J 2321/00* (2013.01); *C08J 2363/00* (2013.01); *C08J 2421/00* (2013.01); *C08J 2463/00* (2013.01); *C08L 21/00* (2013.01)

(58) Field of Classification Search
USPC ........... 264/46.4, 45.1, 45.4, 45.5, 45.6, 46.1, 264/46.2, 46.5, 46.6, 46.7, 48, 50, 51, 54, 264/55, 240, 241, 242, 247, 248, 259, 260, 264/261, 263, 265, 267, 272.13, 279, 328.1, 264/328.8, 328.11, 328.17
See application file for complete search history.

(56) References Cited

U.S. PATENT DOCUMENTS

| 4,898,630 | A | * | 2/1990 | Kitoh et al. ............... 156/79 |
| 5,578,671 | A | | 11/1996 | Welna |
| 5,804,608 | A | | 9/1998 | Nakazato et al. |
| 5,931,474 | A | * | 8/1999 | Chang et al. .............. 277/316 |

FOREIGN PATENT DOCUMENTS

| JP | 62-62882 | 3/1987 |
| JP | 1-135895 | 5/1989 |

(Continued)

*Primary Examiner* — Stella Yi
(74) *Attorney, Agent, or Firm* — Jacobson Holman PLLC (57) ABSTRACT

An automatic injecting type paste form heat-blowing injection composition comprising a partially crosslinked rubber, an unvulcanized rubber, a crosslinking agent, a plasticizer, a thermoplastic resin, an epoxy resin and a latent curing agent thereof, and a blowing agent. This composition can be used in a injecting and soundproofing method comprising forming an insulation wall by heating and foaming of a injection composition in a closed section of an automobile body part having a closed section frame which is produced by press molding in a body welding step of an automobile manufacturing line, and it has a good anti-stringy property and suffers form less sagging during heating and foaming.

7 Claims, 2 Drawing Sheets

(56) References Cited

FOREIGN PATENT DOCUMENTS

| | | |
|---|---|---|
| JP | 4-264142 | 9/1992 |
| JP | 05-059345 | 3/1993 |
| JP | 5-263053 | 10/1993 |
| JP | 8-198995 | 8/1996 |
| JP | 10-236332 | 9/1998 |
| JP | 30175710 | 12/1999 |

* cited by examiner

Paste damming injection composition ——— Example 1 (Dynamic viscoelasticity, viscosity)
Paste damming injection composition ------ Comp. Ex. 1 (Dynamic viscoelasticity, viscosity)
Paste damming injection composition ——— Comp. Ex. 2 (Dynamic viscoelasticity, viscosity)
Paste injection composition – – – – Example 1 (DSC)

PASTE FORM HEAT-BLOWING INJECTION COMPOSITION AND METHOD FOR INJECTING AND SOUNDPROOFING CLOSED SECTION OF AUTOMOBILE BODY MEMBER

This is a divisional of Ser. No. 10/559,477, filed, Dec. 5, 2005 now abandoned, which is a 371 of PCT/JP2004/007997, filed Jun. 2, 2004.

FIELD OF THE INVENTION

The present invention relates to a paste form heat-blowing injection composition and a method for injecting and soundproofing a closed section of an automobile body part. In particular, the present invention relates to a method for injecting an insulation wall of a body part having a closed section frame for shutting out wind noise during driving of an automobile, and an automatic injecting type paste form heat-blowing injection composition used for forming an insulation wall in the above method. Furthermore, the present invention relates to an automatic injecting type paste form heat-curable damming injection composition which prevents the sag of the heat-blowing injection composition during the heat-blowing of said composition to form the insulation wall.

BACKGROUND ART

Among automobile body parts having a closed section frame, a windshield pillar (A pillar), a center pillar (B pillar), a rear pillar (C pillar), a wheel arch (tire housing) and a side sill may cause wind noise. Therefore, the closed section of such a part is usually filled with a foam for shutting out noises (an insulation wall).

For example, a prefoamed polyurethane foam is crammed into the closed section of an automobile body part by hands, or a shaped material of a heat-blowing injection composition is adhered to the inside surface of the closed section and then thermally foamed in a baking step. However, neither of these processes can be automated.

Then, as a injection composition suitable for an automated injecting process, an automatic injecting type paste form heat-blowing injection composition was developed. For example, as a injection composition which has an anti-stringy property during application, prevents sagging during thermal blowing and is foamed at a high expansion ratio, a composition is proposed, which comprises a liquid rubber (for decreasing a viscosity and imparting adherence to an oil-surface steel plate), an unvulcanized rubber (for increasing an expansion ratio by virtue of the high retention of expansion gas), a curing agent and a curing accelerator, a softening agent (for lubricating rubber particles), a blowing agent and a blowing aid, a flake-form inorganic filler (for preventing sag and improving an anti-stringy property), and a thixotropic agent (for preventing sag) (see JP-B-3017571). The composition disclosed in this patent specification is applied in the form of beads at specified sites of a panel and then cured in a foamed state by heating in a baking oven in a subsequent step of electrodeposition coating. The cured material exhibits good performances of soundproofing and shutting out wind noise.

DISCLOSURE OF THE INVENTION

An object of the present invention is to provide an automatic injecting type paste form heat-blowing injection composition with a high blowing performance, which is in superior to the conventional injection compositions, and which has an anti-stringy property during application and can prevent sag during thermal blowing.

Another object of the present invention is to provide a method for injecting and soundproofing a closed section of an automobile body part, which has a large closed sectional area and thus cannot be completely injected with a conventional paste form heat-blowing injection composition, for example, a B pillar which is substantially vertically held and has a large closed section.

A further object of the present invention is to provide a paste form heat-curable damming injection composition which is suitably used as a damming material in the method of injecting and soundproofing a closed section of an automobile body part according to the present invention.

To achieve the above objects, the present inventions have made extensive researches. As a result, it has been found that a paste form composition having a sufficient viscosity for maintaining an applied shape (shape-maintenance) can be obtained when an epoxy resin as a thermally curable material and a latent curing agent thereof, and also a blowing agent are compounding in a composition comprising a partially crosslinked rubber, an unvulcanized rubber, a plasticizer, a thermoplastic resin and a crosslinking agent, and that such a paste form composition can be automatically applied, in particular, the partially crosslinked rubber contributes to an anti-stringy property during application, a film is formed by the thermal swelling of the plasticizer and the thermoplastic resin and the thermal crosslinking of the unvulcanized rubber with the crosslinking, and the thermal curing of the epoxy resin contributes to the toughness of the film and also the formation of foam cells.

The conventional composition uses a flake-form inorganic filler such as mica or talc to improve the anti-stringy property of the composition. However, the use of the flake-form inorganic filler may deteriorate the discharging and blowing properties of the composition.

Figure 1:
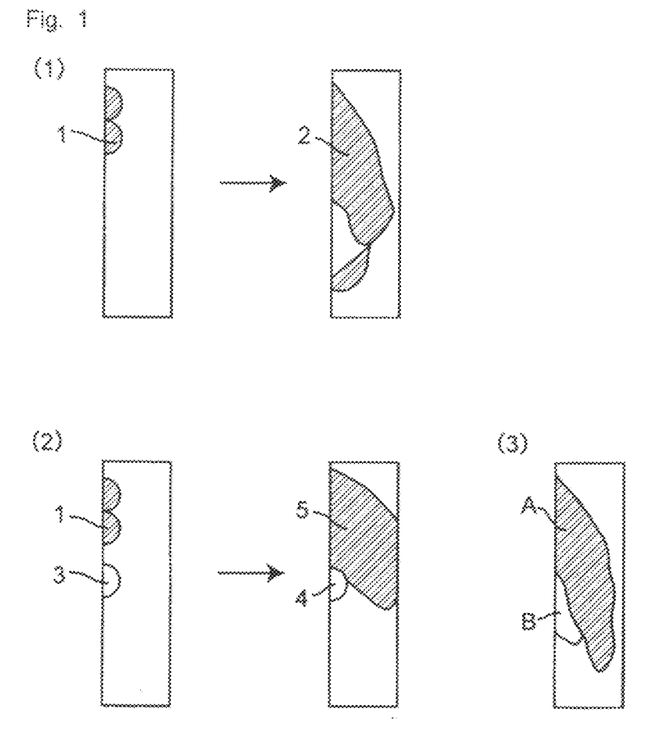
FIG. 1 schematically explains the soundproofing effect achieved by the use of a paste form damming injection composition according to the present invention in the case of a member having a large cross sectional area.

The automatic injecting type paste form heat-blowing injection composition of the present invention can achieve the desired soundproofing effect, but the present inventors made further investigations and found the following:

In a case where the injection composition is applied to the pillar, in particular, a part of the pillar having a relatively large cross sectional area, when the injection composition 1 of the present invention or the conventional injection composition is applied in the form of two rows of beads as shown in FIG. 1 (1), and then heated and foamed, the composition tends to sag and flow in the step of thermal blowing and form a foam 2 as shown in FIG. 1 (2) with insufficient injecting.

When an automatic injecting type paste form heat-curable damming injection composition 3 is applied in the form of beads at a suitable position shown in FIG. 1 (2) to prevent such sagging of the paste form heat-blowing injection composition and then the paste form heat-blowing injection composition 1 is heated and foamed, a cured damming material 4 is formed and prevents the sagging of the injection composition so that a foam 5 shown in FIG. 1 (2), that is, an insulation wall is formed.

To prevent the sagging and the flowing of the injection composition as described above, the composition of the damming injection composition 3 should be designed such that the damming injection composition 3 cures to gel prior to the occurrence of sagging of the injection composition 1 during heating and blowing of the injection composition and the gelled damming injection composition has shape maintenance for withstanding the pressure of the injection composition which sags and flows during thermal blowing.

The present invention has been completed based on the above findings.

Accordingly, the present invention provides:

(1) an automatic injecting type paste form heat-blowing injection composition comprising a partially crosslinked rubber, an unvulcanized rubber, a crosslinking agent, a plasticizer, a thermoplastic resin, an epoxy resin and a latent curing agent thereof, and a blowing agent, which composition preferably has a viscosity of 30 to 500 Pa·s (at 20° C.) and a blowing start temperature of at least 100° C.;

(2) a method for injecting and soundproofing a closed section of an automobile body part comprising the steps of:

applying an automatic injecting type paste form heat-blowing injection composition to a closed section of an automobile body part having a closed section frame, which is press molded in a body welding step of an automobile manufacturing line, prior to the assembling of the body part, carrying the automobile body part applied with the heat-blowing injection composition to a pretreatment and electrodeposition coating step, and heating and blowing the injection composition under baking conditions in an electrodeposition oven in an electrodeposition coating step to inject the closed section with an insulation wall made of the foamed material of the injection composition, wherein an automatic injecting type paste form heat-curable damming injection composition, which preferably comprises a partially crosslinked rubber, a plasticizer, a thermoplastic resin, and optionally an epoxy resin and a latent curing agent thereof and has a viscosity of 30 to 500 Pa·s (at 20° C.), a gelation start temperature of 90° C. or less and a viscosity after gelation of at least 100,000 Pa·s, is applied in adjacent to the paste form heat-blowing injection composition or at a distance from the injection composition, thereby the sagging of the injection composition is prevented by the gelled damming injection composition when the insulation wall formed from the injection composition insufficiently fill the closed section because of the sagging of the injection composition during heating and blowing;

and (3) an automatic injecting type paste form heat-curable damming injection composition comprising a partially crosslinked rubber, a plasticizer, a thermoplastic resin, and optionally an epoxy resin and a latent curing agent thereof.

PREFERRED EMBODIMENTS FOR WORKING THE INVENTION (a) Partially Crosslinked Rubber A partially crosslinked rubber used in the present invention means a diene rubber which is partially crosslinked or cured with a crosslinking agent such as divinylbenzene or sulfur. Examples of the diene rubber include acrylonitrile-isoprene copolymer rubber (NIR), acrylonitrile-butadiene copolymer rubber (NBR), styrene-butadiene copolymer rubber (SBR), butadiene rubber (BR), isoprene rubber (IR), etc. The partially crosslinked rubber includes reclaimed rubber which has been desulfurized.

The use of the partially crosslinked rubber can improve an anti-stringy property when the composition containing no flake-form inorganic filler is applied.

(b) Unvulcanized (Uncrosslinked) Rubber

Examples of the unvulcanized rubber include NIR, NBR, SBR, BR, IR, natural rubber, etc.

(c) Crosslinking Agent

As a crosslinking agent used in the paste form heat-blowing injection composition of the present invention, any conventional crosslinking agent can be used as long as it is activated by heating and crosslinks a rubber. Preferable examples of the crosslinking agent are organic peroxides (e.g. ketone peroxides, peroxyketals, hydroperoxides, dialkyl peroxides, phenyl peroxides, peroxyesters, peroxydicarbonates, etc.). These crosslinking agents may be used independently or as a mixture of two or more of them depending on heating conditions or desired properties of crosslinked materials.

(d) Plasticizer

A plasticizer used in the present invention may be any plasticizer that can swell or dissolve the partially crosslinked rubber, the unvulcanized rubber and a thermplastic resin which will be explained below.

Specific examples of the plasticizer include phthalates such as di(2-ethylhexyl) phthalate, butylbenzyl phthalate, dinonyl phthalate, diisononyl phthalate, diisodecyl phthalate, diundecyl phthalate, diheptyl phthalate, butylphthalylbutyl glycolate, etc.; esters of aliphatic dibasic carboxylic acids such as dioctyl adipate, didecyl adipate, dioctyl sebacate, etc.; polyglycol esters of benzoic acid such as polyoxyethylene glycol dipenzoate, polyoxypropylene glycol dibenzoate, etc.; phosphates such as tributyl phosphate, tricresyl phosphate, etc.; hydrocarbons such as alkyl-substituted diphenyl, alkyl-substituted terphenyl, partially hydrogenated alkyl-terphenyl, aromatic process oil, pine oil, etc.

(e) Thermoplastic Resin

A thermoplastic resin used in the present invention is a resin which is present in the form of particles at room temperature and can be made swellable and soluble in the plasticizer above when heated. Specific examples of the plasticizer include acrylic resins such as polymers of alkyl acrylates (e.g. methyl acrylate, ethyl acrylate, butyl acrylate, 2-ethylhexyl acrylate, etc.) or alkyl methacrylate (e.g. methyl methacrylate, ethyl methacrylate, butyl methacrylate, lauryl methacrylate, stearyl methacrylate, etc.), or copolymers of alkyl acrylate or alkyl methacrylate with other acrylic monomers; MBS resins (methyl methacrylate-butadiene-styrene copolymer); ionomers; AAS resins (acrylonitrile-styrene-specific rubber copolymer); AES resins (acrylonitrile-EPDM-styrene copolymer), AS resins (acrylonitrile-styrene copolymer); ABS resins (acrylonitrile-butadiene-styrene copolymer); polyurethane resins; polyester resins; and the like. These resins may be used independently or as a mixture of two or more of them in combination with the plasticizer. Particularly in the case of a paste form heat-curable damming injection composition, the thermoplastic resin and the plasticizer may used in amounts such that the composition has a gelation start temperature of 90° C. or less and a viscosity after gelation of at least 100,000 Pa·s at a gelling temperature.

(f) Epoxy Resin

An epoxy resin used in the present invention may be any epoxy resin that is used in this art field. Specific examples of the epoxy resin include glycidyl ether epoxy resins, glycidyl ester epoxy resins, glycidyl amine epoxy resins, linear aliphatic epoxide epoxy resins, alicyclic epoxide epoxy resins, their modified derivatives such as rubber-modified epoxy resins, for example, reaction products of bisphenol epoxy resins (e.g. diglycidyl ethers of bisphenol A, bisphenol F or bisphenol AD, diglycidyl ethers of alkylene oxide adducts of bisphenol A, etc.) with butadiene-acrylonitrile-(meth)acrylic acid copolymer, urethane-modified epoxy resins, for example, reaction products of OH-containing epoxy resins (e.g. diglycidyl ether of bisphenol A, diglycidyl ether of aliphatic polyhydric alcohol, etc.) with urethane prepolymers having terminal NCO groups which are prepared by reacting polytetramethylene ether glycol (having a molecular weight of 500 to 5,000) and an excess amount of diisocyanates (e.g. tolylene diisocyanate, diphenylmethane diisocyanate, etc.), thiokol-modified epoxy resins, and so on.

These epoxy resins may be used independently or as a mixture of two or more of them.

(g) Latent Curing Agent

A latent curing agent used in the present invention may be any conventional curing agent that exhibits a curing function by heating and can be activated usually at a temperature between 80 to 250° C. Specific examples of the latent curing agent include dicyandiamide, 4,4'-diaminodiphenylsulfone, imidazole derivatives (e.g. 2-n-heptadecylimidazole, etc.), isophthalic dihydrazide, N,N-dialkylurea derivatives, N,N-dialkylthiourea derivatives, melamine derivatives, etc. These curing agents may be used independently or as a mixture of two or more of them depending on curing conditions or their properties.

(h) Blowing Agent

A blowing agent used in the paste form heat-blowing injection composition of the present invention may be any blowing agent that is decomposed by heating to generate gas. Specific examples of the blowing agent include azo compounds (e.g. azodicarbonamide, etc.), nitroso compounds (e.g. N,N'-dinitrosopentamethylenetetramine, etc.), hydrazine compounds (e.g. diphenylsulfone-3,3'-disulfohydrazide, etc.), and so on. These blowing agents may be used independently or as a mixture of two or more of them preferably in combination with blowing aids (e.g. urea, etc.).

(A) Automatic Injecting Type Paste Form Heat-Blowing Injection Composition

The automatic injecting type paste form heat-blowing injection composition according to the present invention (hereinafter simply referred to as "paste injection composition") contains a partially crosslinked rubber, an unvulcanized rubber, a crosslinking agent, a plasticizer, a thermoplastic resin, an epoxy resin and a latent curing agent thereof, and a blowing agent and optionally a blowing aid. The paste injection composition preferably has a viscosity of 30 to 500 Pa·s (at 20° C. and a shear rate of 430 sec$^{-1}$), and its blowing temperature is preferably adjusted at least 100° C., more preferably 110 to 140° C.

The paste injection composition of the present invention may optionally contain conventional additives such as thixtropic agent (e.g. organic bentonite, fumed silica, aluminum stearate, metal soap, caster oil derivatives, etc.), fillers (e.g. heavy calcium carbonate, surface-treated calcium carbonate, clay, silica, resin powder, fly ash, etc.), pigments (e.g. carbon black, titanium oxide, other inorganic pigments, etc.), dehydrating agents (e.g. calcium oxide, powder silica gel, etc.), and so on in suitable amounts.

A preferable formulation of the paste injection composition of the present invention are as follows (% is "a % by weight" based on the weight of the whole composition):
Preferable Formulation of Paste Injection Composition:

| | |
|---|---|
| Partially crosslinked rubber | 1-10%, preferably 3-7% |
| Unvulcanized rubber | 1-10%, preferably 3-7% |
| Crosslinking agent | 0.01-5%, preferably 0.02-0.6% |
| Plasticizer | 30-50%, preferable 30-40% |
| Thermoplastic resin | 1-15%, preferably 4-12% |
| Epoxy resin | 0.5-10%, preferably 1-7% |
| Latent curing agent | 0.05-5%, preferably 0.1-3% |
| Blowing agent | 1-10%, preferably 2-7% |
| Additive(s) | 25-45%, preferably 30-40% |

When the amount of the partially crosslinked rubber is less than 1%, the anti-stringy property of the composition may not be improved. When the amount of the partially crosslinked rubber exceeds 10%, a discharge property deteriorates and an expansion ratio tends to decrease.

When the amount of the unvulcanized rubber is less than 1%, an expansion ratio of the composition may be insufficient. When the amount of the unvulcanized rubber exceeds 10%, it may be difficult to achieve sufficient discharge and/or anti-stringy properties.

When the amount of the plasticizer is less than 30%, the production of the composition is difficult, and a discharge property of the composition deteriorate. When amount of the plasticizer exceeds 50%, the liberated plasticizer tends to bleed out after curing to cause the shrinkage of the foam.

When the amount of the thermoplastic resin is less than 1%, the formation of a film may be insufficient, and a sufficient expansion ratio may not be attained. When the amount of the thermoplastic resin exceeds 15%, the viscosity stability of the composition tends to greatly deteriorate so that the discharge property deteriorate.

When the amount of the epoxy resin exceeds 10%, the elongation of the cured material of the composition tends to decrease so that the expansion ratio decreases, and the injecting property deteriorates. The lower limit of the amount of the epoxy resin may not be particularly limited, but it is usually 0.5%. When the amount of the epoxy resin is less than 0.5%, the adhesion of the composition to a metal surface may tend to decrease. In addition, the foam of the cured material of the composition tends to shrink when the composition is cured at a temperature of 180° C. or higher.

When the amount of the latent curing agent exceeds 5%, the effect of the latent curing agent on the curing of the epoxy resin may saturate. The lower limit of the amount of the latent curing agent may not be particularly limited, but it is usually 0.05%. When the amount of the latent curing agent is less than 0.05%, the epoxy resin may be insufficiently cured.

When the amount of the crosslinking agent exceeds 5%, the adhesion of the composition tends to decrease, and such an amount of the crosslinking agent is excessive since the crosslinking degree of the unvulcanized rubber is already saturated at an amount of 5% or less of the crosslinking agent. The lower limit of the amount of the crosslinking agent may not be particularly limited, but it is usually 0.01%. When the amount of the crosslinking agent is less than 0.01%, the formation of a film may be insufficient, and a sufficient expansion ratio may not be attained.

When the amount of the blowing agent is less than 1%, the expansion ratio may be insufficient. When the amount of the blowing agent exceeds 10%, open cells tend to form or the composition may insufficiently be adhered to a substrate because of excessive blowing.

(B) Automatic Injecting Type Paste Form Heat-Curable Damming Injection Composition The automatic injecting type paste form heat-curable damming injection composition of the present invention (hereinafter simply referred to as "paste damming injection composition") has a preferred formulation described below, and a viscosity of 30 to 500 Pa·s (at 20° C. and a shear rate of 430 sec$^{-1}$), its gelation starting temperature is 90° C. or less, and it has a viscosity after gelation of 100,000 Pa·s (at a gelation temperature).

Preferable Formulation of Paste Damming Injection Composition:

| | |
|---|---|
| Partially crosslinked rubber | 1-15%, preferably 4-10% |
| Plasticizer | 20-40%, preferable 25-35% |
| Thermoplastic resin | 5-20%, preferably 8-15% |
| Epoxy resin | 10% or less, preferably 0.5-10%, more preferably 1-6% |
| Latent curing agent | 5% or less, preferably 0.1-5%, more preferably 1-3% |
| Additive(s) | 40-60%, preferably 45-55% |

When the amount of the partially crosslinked rubber is less than 1%, the anti-stringy property and also the maintenance of a shape may be insufficient. When the amount of the partially crosslinked rubber exceeds 15%, a discharge property of the composition tends to deteriorate.

When the amount of the plasticizer is less than 20%, the production of the composition is difficult, and a discharge property of the composition is insufficient. When amount of the plasticizer exceeds 40%, the composition may sag so that the shape of the applied composition may not be maintained. In addition, as the relative amount of the thermoplastic resin decreases, the viscosity of the damming injection composition during gelation tends to decrease so that the damming injection composition cannot resist against the blowing pressure of the foam.

When the amount of the thermoplastic resin is less than 5%, the viscosity of the damming injection composition during gelation is low so that the damming injection composition cannot resist against the pressure of the sagging paste injection composition and thus the closed section of the automobile body part is insufficiently filled. When the amount of the thermoplastic resin exceeds 20%, the viscosity stability of the damming injection composition tends to greatly deteriorate so that the discharge property may be adversely affected.

When the amount of the epoxy resin exceeds 10%, the viscosity stability of the composition tends to decrease. The lower limit of the amount of the epoxy resin may not be particularly limited, but it is usually 0.5%. When the amount of the epoxy resin is less than 0.5%, the adhesion of the composition to a metal surface may decrease.

When the amount of the latent curing agent exceeds 5%, the effect of the latent curing agent on the curing of the epoxy resin may not be further improved, while the viscosity stability of the damming injection composition tends to deteriorate. The lower limit of the amount of the latent curing agent may not be particularly limited, but it is usually 0.1%. When the amount of the latent curing agent is less than 0.1%, the epoxy resin may be insufficiently cured.

(C) Injecting and Soundproofing a Closed Section of an Automobile Body Part

Hereinafter, a method for injecting and soundproofing a closed section of an automobile body part with a paste injection composition and a paste damming injection composition according to the present invention will be explained.

In the automobile manufacturing line [body welding step->pretreatment steps (showering->degreasing->showering->phosphate treatment->showering)->electrodeposition coating steps (showering->electrodeposition coating->showering->baking in an electrodeposition oven)->various coating steps (assembly steps), the injecting and soundproofing method of the present invention may be carried out in the following procedures:

Firstly, before welding of automobile parts (A pillar, B pillar, C pillar, a wheel arch (tire housing), a side sill, etc.), which are press molded in the body welding step and have closed sectional structures, the paste injection composition of the present invention is automatically applied to a respective surface site of the automobile body part preferably with a robot system in the form of a single or multiple beads (or bands). An applied amount of the paste injection composition may be determined depending on the cross sectional area of the closed section, and is usually from 0.1 to 10 cc per square centimeter (cm$^2$) of the cross sectional area.

Next, the paste damming injection composition is applied in adjacent to the paste injection composition, or at a distance from the paste injection composition, for example, a distance of 0 to 100 mm, in an amount of 0.05 to 5 cc per square centimeter (cm$^2$) of the cross sectional area. The paste damming injection composition is also preferably automatically applied.

After the application of the respective compositions, the automobile body parts are assembled by spot welding, and then passed through the pretreatment steps and the electrodeposition coating step. In these steps, although the paste injection composition and the paste damming injection composition are uncured, they are have good resistance to shower and do not fly about, dissolve or drop off in the phosphate treating liquid or the electrodeposition coating liquid, since they have good shape maintenance properties. Then, the assembled automobile body parts are heated under the baking conditions in the electrodeposition oven in the electrodeposition coating step usually at a temperature of 140 to 220° C. for 10 to 60 minutes.

In this heating step, the heat-blowing of the paste injection composition and the heat-curing of the paste damming injection composition begin and gradually proceed. The paste damming injection composition begins to gel at a temperature lower than 100° C. at which the blowing of the paste injection composition begins, and the gelled damming injection composition has a very high viscosity of, for example, 100,000 Pa·s or larger. Therefore, the gelled damming injection composition can prevent the sagging of the paste injection composition, if the latter sags. As shown in FIG. 1 (2), the paste injection composition forms a foam having a good expansion ratio of 3 to 30 (an insulation wall).

EXAMPLES

The present invention will be illustrated by the following examples and comparative examples.

Example 1 and Comparative Examples 1 and 2

(1) Preparation of Paste Injection Composition

The following components were stirred and mixed with a planetary mixer for 30 minutes and then defoamed under reduced pressure for 30 minutes to obtain a paste injection composition having a viscosity of 80 Pa·s (at 20° C. and a shear rate of 430 sec$^{-1}$). That is, the expansion ratio of this composition was set at 10 times.

| Component | PBW |
|---|---|
| Partially crosslinked rubber | 5 |
| (SBR: "Nipol 1009" available from Zeon Corporation) | |
| Unvulcanized rubber | 5 |
| (BR: "130 B" available from Ube Industries Ltd.) | |
| Plasticizer (DINP) | 36 |
| Thermoplastic resin | 8 |
| (Acrylic resin: "LP-3102" available from Mitsubishi Rayon Co., Ltd.) | |
| Epoxy resin | 5 |
| (bisphenyl A type: "Epikoat 828" available from Japan Epoxy Resin Co., Ltd.) | |
| Latent curing agent | 1.9 |
| (dicyandiamide:benzoguanamine = 1:1 by weight) | |
| Blowing agent (azodicarbonamide) | 4 |
| Blowing aid (urea) | 2 |
| Thixotropic agent | 8 |
| (surface-treated calcium carbonate "Viscolite SV" available from Shiraishi Calcium Kaisha Ltd.) | |
| Heavy calcium carbonate | 23 |
| ("JUTAN 300 M" available from Bihoku Funka Kogyo Co., Ltd.) | |
| Pigment (carbon black) | 2 |
| Crosslinking agent | 0.1 |
| (peroxyester "Perbutyl Z" available from NOF Corporation) | |
| Total | 100 |

PBW: Parts by weight (2) Preparation of Paste Damming Injection Composition

The components shown in Table 1 were stirred and mixed with a planetary mixer for 30 minutes and then defoamed under reduced pressure for 30 minutes to obtain a paste damming injection composition. The viscosity of the resulting composition (at 20° C. and a shear rate of 430 sec$^{-1}$) is also shown in Table 1.

TABLE 1

|  | Ex. | Comp. Ex. | |
|---|---|---|---|
|  | 1 | 1 | 2 |
| Partially crosslinked rubber | 6 | 6 | 6 |
| (SBR: "Nipol 1009" available from Zeon Corporation) | | | |
| Plasticizer (DINP) | 30 | 35 | 30 |
| Thermoplastic resin | 12 | 7 | — |
| ("LP-3102" available from Mitsubishi Rayon Co., Ltd.) | | | |
| Epoxy resin | 2 | 2 | 2 |
| ("Epikoat 828" available from Japan Epoxy Resin Co., Ltd.) | | | |
| Latent curing agent (dicyandiamide) | 2 | 2 | 2 |
| Vinyl chloride resin | — | — | 12 |
| ("PSH-180" available from Kaneka Corporation) | | | |
| Thixotropic agent | 4 | 10 | 4 |
| ("HAKUENKA CC" available from Shiraishi Calcium Kaisha Ltd.) | | | |
| Calcium carbonate | 42.9 | 36.9 | 42.9 |
| ("JUTAN 300 M" available from Bihoku Funka Kogyo Co., Ltd.) | | | |
| Pigment (carbon black) | 0.1 | 0.1 | 0.1 |
| Dehydrating agent (calcium oxide) | 1 | 1 | 1 |
| Total | 100 | 100 | 100 |
| Viscosity (20° C., a shear rate: 430 sec$^{-1}$) | 80 | 70 | 80 |

Figure 2:
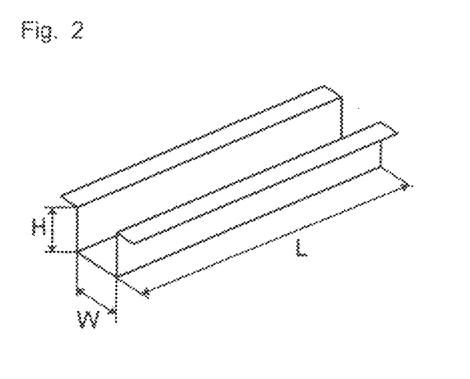
FIG. 2 is a schematic perspective view of a member used in Example 1 and Comparative Examples 1 and 2 with showing sizes.
Figure 3:
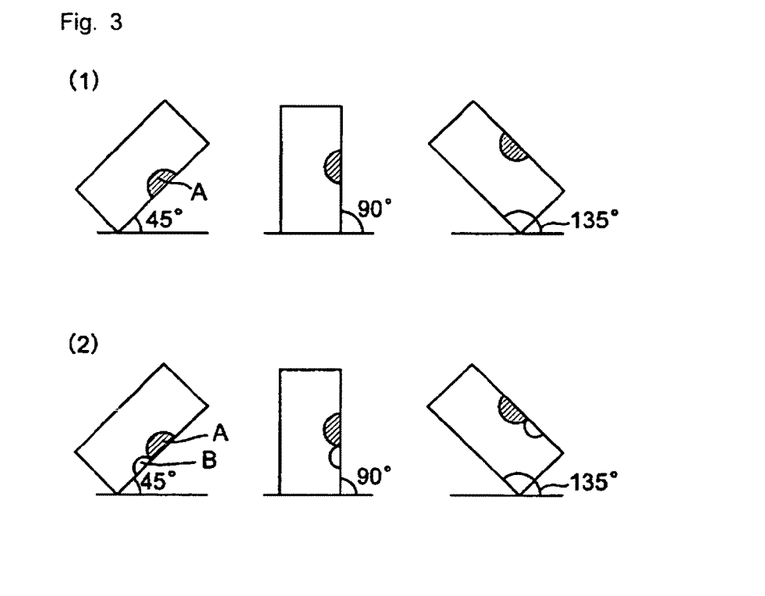
FIG. 3 schematically shows the angles of inclination of the member used in Example 1 and Comparative Examples 1 and 2, and the application position of a paste form damming injection composition according to the present invention.

(3) Production of Filler Foam i) The paste injection composition A in an amount of 30 cc or 45 cc was applied in the bead form along a line on the bottom of a member having a shape shown in FIG. 2 and sizes of W=38 mm, H=35 mm and L=150 mm without using any damming material. Then, the member was heated at 160° C. for 20 minutes with maintaining the member at an angle of inclination of 45 degrees, 90 degrees or 135 degrees as shown in FIG. 3 (1). At these three angles, the foam completely filled the member in full. When the cross sectional area of the member is moderate, the paste injection composition alone can achieve the desired soundproofing effect.

ii) The paste injection composition A in an amount shown in Table 2 was applied in the bead form along a line on the bottom of a member having a relatively large cross sectional area having a shape shown in FIG. 2 and sizes: W=50 mm, H=40 mm and L=300 mm, and then the paste damming injection composition prepared in Step (2) above in an amount of 10 cc each was applied at a position shown in FIG. 3 (2) in the bead form along a line. Thereafter, the member was heated under the same heating conditions with maintaining the member at same angles of inclination as above i). The filling states of the foam formed from the injection composition are reported in Table 2. In Table 2, "Y" means the complete filling, and "N" means that the filling is incomplete as shown in FIG. 1 (1) in the case of using no damming material, or that the paste injection composition A and the paste damming injection composition B had substantially the same curing rates so that the uncured paste damming injection composition flows as the paste injection composition sags, thus, the filling was incomplete.

TABLE 2

| Angle (deg.) | Amount applied (cc) | Without damming material | With damming material | | |
|---|---|---|---|---|---|
| | | | Ex. 1 | Comp. Ex. 1 | Comp. Ex. 2 |
| 45 | 30 | Y | Y | — | — |
| | 45 | Y | Y | | |

TABLE 2-continued

| Angle (deg.) | Amount applied (cc) | Without damming material | With damming material Ex. 1 | With damming material Comp. Ex. 1 | With damming material Comp. Ex. 2 |
|---|---|---|---|---|---|
| 90 | 30 | N | Y | N | N |
|    | 45 | N | Y | Y | Y |
| 135 | 30 | N | Y | — | — |
|     | 45 | N | Y |   |   | iii) A member shown in FIG. 2 having sizes of W=60 mm, H=50 mm and L=300 mm and thus a larger cross sectional area was treated in the same was as in ii) above. The results are reported in Table 3.

TABLE 3

| Angle (deg.) | Amount applied (cc) | Without damming material | With damming material Ex. 1 | With damming material Comp. Ex. 1 | With damming material Comp. Ex. 2 |
|---|---|---|---|---|---|
| 45 | 30 | N | Y | — | — |
|    | 45 | Y | Y |   |   |
| 90 | 30 | N | N | N | N |
|    | 45 | N | Y | N | N |
| 135 | 30 | N | N | — | — |
|     | 45 | N | Y |   |   |

Figure 4:
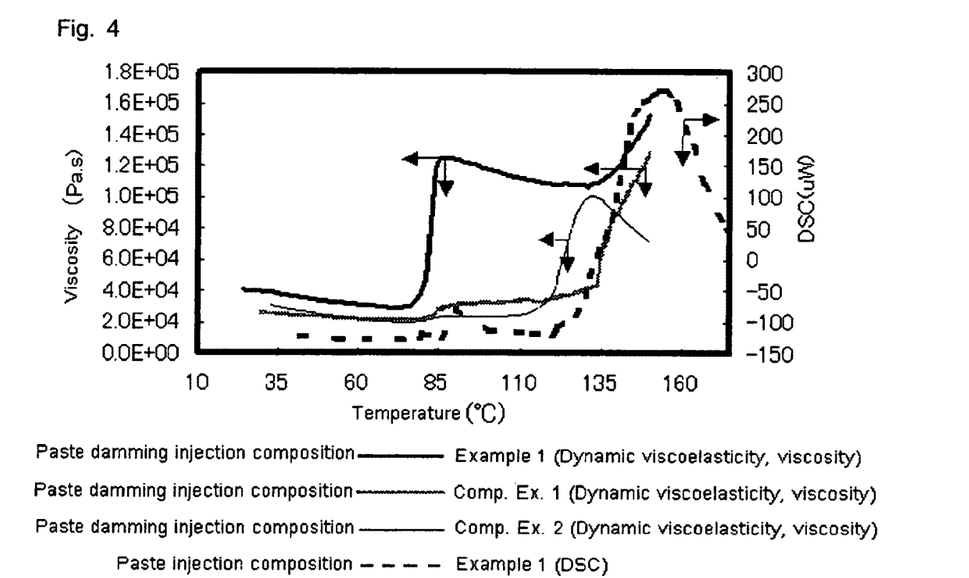
FIG. 4 is a graph showing the gelation behavior according to dynamic viscoelastic measurement and the foaming behavior according to DSC of the paste form injection composition and the paste form damming injection composition used in Example 1 and Comparative Examples 1 and 2.

The paste injection composition and the paste damming injection compositions (Example 1 and Comparative Examples 1 an 2) were subjected to a gelation behavior analysis (paste damming injection compositions) by dynamic viscoelasticity measurement, or a foaming behavior analysis (paste injection composition) by differential scanning calorimetry. The results are shown in FIG. 4.

According to the results in FIG. 4, the paste injection composition started to foam around 120° C., while the gelation behaviors of the paste damming injection compositions of Example 1 and Comparative Examples 1 and 2 were as follows:

In comparison with the paste damming injection compositions of Comparative Examples, the gelation of the paste damming injection composition of Example 1 finished earlier (gelation start temperature: 77.8° C., gelation finish temperature: 86.9° C.). Furthermore, the paste damming injection composition of Example 1 had a very high viscosity (125,000 Pa·s) at the finish of gelation. Therefore, the gelled material of the paste damming injection composition of Example 1 was hardly deformed by the foaming pressure of the paste injection composition so that the former could effectively dam the flow of the latter.

In contrast, although the paste damming injection composition of Comparative Example 1 had substantially the same gelation start temperature (81.9° C.) and the gelation finish temperature (87° C.) as those of the paste damming injection composition of Example 1, it had the lower viscosity at the finish of gelation (29,700 Pa·s). Accordingly, the gelled material of the paste damming injection composition of Comparative Example 1 was deformed by the foaming pressure of the paste injection composition so that the former could not dam the flow of the latter. Although the paste damming injection composition of Comparative Example 2 had a sufficiently high viscosity (101,000 Pa·s) at the finish of gelation, it had a high gelation start temperature (111.9° C.) and a high gelation finish temperature (133° C.). Thus, the gelation could not be completed before the start of foaming of the paste injection composition and the paste damming injection composition of Comparative Example 2 was deformed by the foaming pressure of the paste injection composition.

According to the present invention described above, when the paste damming injection composition of the present invention is used, a closed section of an automobile body part, which has a large cross sectional area and thus cannot be completely filled with a conventional paste form heat-blowing injection composition, but a paste injection composition of the present invention, can be completely filled since the sagging of the paste injection composition is effectively prevented during heating and foaming of the paste injection composition by the use of the paste damming injection composition.

The invention claimed is:

1. A method for injecting and soundproofing a closed section, of an automobile body part comprising the steps of:
   applying an automatic injecting type paste form heat-blowing injection composition to a surface of a closed section frame, which is pressed molded in a body welding step of an automobile manufacturing line, prior to assembling of the body part,
   carrying the automobile body part applied with the heat-blowing injection composition to a pretreament and electrodeposition coating step, and
   heating and blowing the heat-blowing injection composition under baking conditions in an electrodeposition oven in an electrodeposition coating step to fill the closed section with an insulation wall made of a foamed material of the heat-blowing injection composition, wherein an automatic injecting type paste form heat-curable damming injection composition is applied (i) independently of the paste form heat-blowing injection composition, (ii) to the same surface of the closed section frame to which the paste form heat-blowing injection composition is applied, and (iii) adjacent to, or at a distance from, the paste form heat-blowing injection composition, thereby the sagging of the heat-blowing injection composition is prevented by the heat-curable damming injection composition when the insulation wall formed from the heat-blowing injection composition insufficiently fills the closed section because of the sagging of the heat-blowing injection composition during heating and blowing.

2. The method according to claim 1, wherein said automatic injecting type paste form heat-curable damming injection composition comprises a partially crosslinked rubber, a plasticizer, a thermoplastic resin, and optionally an epoxy resin and a latent curing agent thereof.

3. The method according to claim 1, wherein said automobile body part having a closed section frame is an A pillar, a B pillar, a C pillar, a wheel arch (tire housing) or a side sill.

4. The method according to claim 1, wherein said automatic injecting type paste form heat-blowing injection composition comprises a partially crosslinked rubber, an unvulcanized rubber, a crosslinking agent, a plasticizer, a thermoplastic resin, an epoxy resin and a latent curing agent thereof, and a blowing agent.

5. The method according to claim 2, where in said paste form heat-curable damming injection composition comprises, based on the whole weight of the composition, 1 to 15% by weight of the partially crosslinked rubber, 20 to 40% by weight of the plasticizer, 5 to 20% by weight of the thermoplastic resin, 10% by weight or less of the epoxy resin and 5% by weight or less of the latent curing agent thereof, and which has a viscosity of 30 to 500 Pa·s (at 20° C.).

6. The method according to claim 2, wherein said paste form heat-curable damming injection composition comprises, based on the whole weight of the composition, 1 to 15% by weight of the partially crosslinked rubber, 20 to 40% by weight of the plasticizer, 5 to 20% by weight of the thermoplastic resin, 10% by weight or less of the epoxy resin and 5% by weight or less of the latent curing agent thereof, and said composition has a viscosity of 30 to 500 Pa·s (at 20° C.), a gelation start temperature of 90° C. or less and a viscosity after gelation of at least 100,000 Pa·s.

7. The method according to claim 4, Wherein said paste form heat-blowing injection composition comprises, based on the whole weight of the composition, 1 to 10% by weight of the partially crosslinked rubber, 1 to 10% by weight of the unvulcanized rubber, 0.01 to 5% by weight of the crosslinking agent, 30 to 50% by weight of the plasticizer, 1 to 15% by weight of the thermoplastic resin, 0.5 to 10% by weight of the epoxy resin, 0.05 to 5% by weight of the latent curing agent, and 1 to 10% by weight of the blowing agent, and Which has a viscosity of 30 to 500 Pa·s (at 20° C.) and a blowing start temperature of at least 100° C.

\* \* \* \* \*